April 21, 1964 A. M. RENARD 3,130,388

NON-DESTRUCTIVE SENSING MEMORY

Filed May 2, 1960

INVENTOR
ANDRE M. RENARD

BY Cushman, Darby & Cushman
ATTORNEYS

United States Patent Office 3,130,388

Patented Apr. 21, 1964

3,130,388

NON-DESTRUCTIVE SENSING MEMORY

Andre M. Renard, Costa Mesa, Calif., assignor to Sperry Rand Corporation, New York, N.Y., a corporation of Delaware Filed May 2, 1960, Ser. No. 26,358

16 Claims. (Cl. 340—173)

Figure 1:
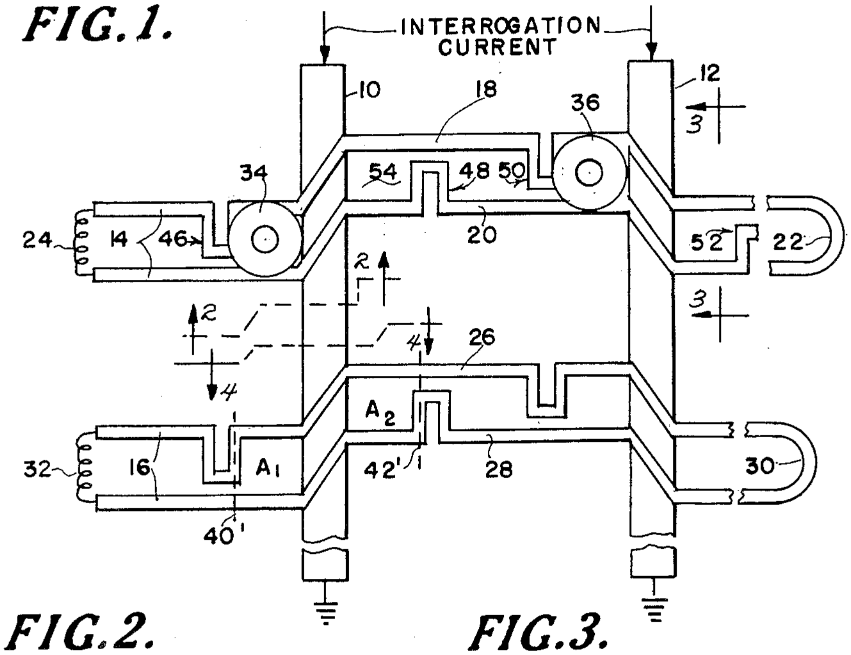

This invention relates to a memory with non-destructive sensing provisions.

In one embodiment of this invention, the memory is of the type disclosed in the copending application of Richard J. Petschauer, Serial No. 26,279, filed May 2, 1960, in that binary digits are represented in a "permanent" manner, i.e., unchangeable by any electrical or magnetic signals. The value of a binary digit, however, may be changed manually as by the removal or addition of a non-magnetic metallic means.

In one embodiment of the present invention the presence of a copper ring on one side of a drive line at the intersection of that drive line and a loop output line causes a counter flux in response to flux encircling the drive line as produced by interrogation current applied to the drive line. This counter flux reduces the net flux coupled to the output line on that side of the drive line where the copper ring is disposed. This causes an unbalanced flux condition in the output line as between the opposite sides thereof relative to the drive line, which in turn generates a substantial voltage across the output line. The presence of the copper ring may indicate the storage of a binary 1 in the memory and the resultant voltage may be referred to as a binary 1 signal. On the other hand when no such copper ring is disposed near the intersection of a drive line and an output line, equal output line areas on opposite sides of the drive line will be cut by equal but opposite polarity fluxes since the flux density in those areas is also equal. Consequently, no voltage of any significance is induced across the output line in response to an interrogation current applied to a drive line. The absence of a copper ring may therefore be considered the storage of a binary 0, with the lack of a significant output voltage across an output line when the interrogation current is applied being a binary 0 output signal.

In another embodiment of this invention, the flux density linking the output line on opposite sides of a drive line is held constant, but the area of the output line on one of those sides is variable from being equal to the area on the other side to being substantially larger than that area. When the areas are equal, the intersection of the drive line and output line may be said to be storing a binary 0, and when the areas are unequal a binary 1 may be effectively stored thereat. With unequal areas, the flux condition of the output line at an intersection thereof with the drive line is unbalanced when current is applied to the drive line, causing a substantial voltage to be generated across the drive line. Conversely, if the areas are equal, no such voltage is generated.

In either of the above embodiments, it is apparent that the application of an interrogating current cannot change the sense of the binary digit stored at any intersection of the drive and output lines. Therefore, the stored condition is non-destructively sensed.

It is therefore an object of this invention to provide a memory with non-destructive sensing provisions with storage of a binary condition being indicated by the presence or absence of a copper ring adjacent the drive line in an area of the output line adjacent one side of a drive line which insulatively crosses the output line, with the copper ring when present being effective to generate a substantial counter flux to cause unbalancing of an otherwise balanced flux condition in the output line upon application of an interrogation current to the drive line.

Another object of this invention is the provision of means for causing the area of an output line on one side of a crossing drive line to be unequal to the output line area on the other side of the drive line so as to effect an unbalanced flux condition in the output line when interrogation current is applied to the drive line.

Figure 2:
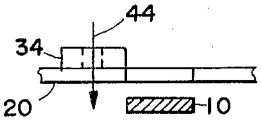
Figure 3:
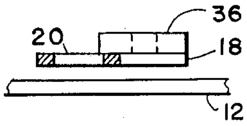
Figures 4, 5, 6:
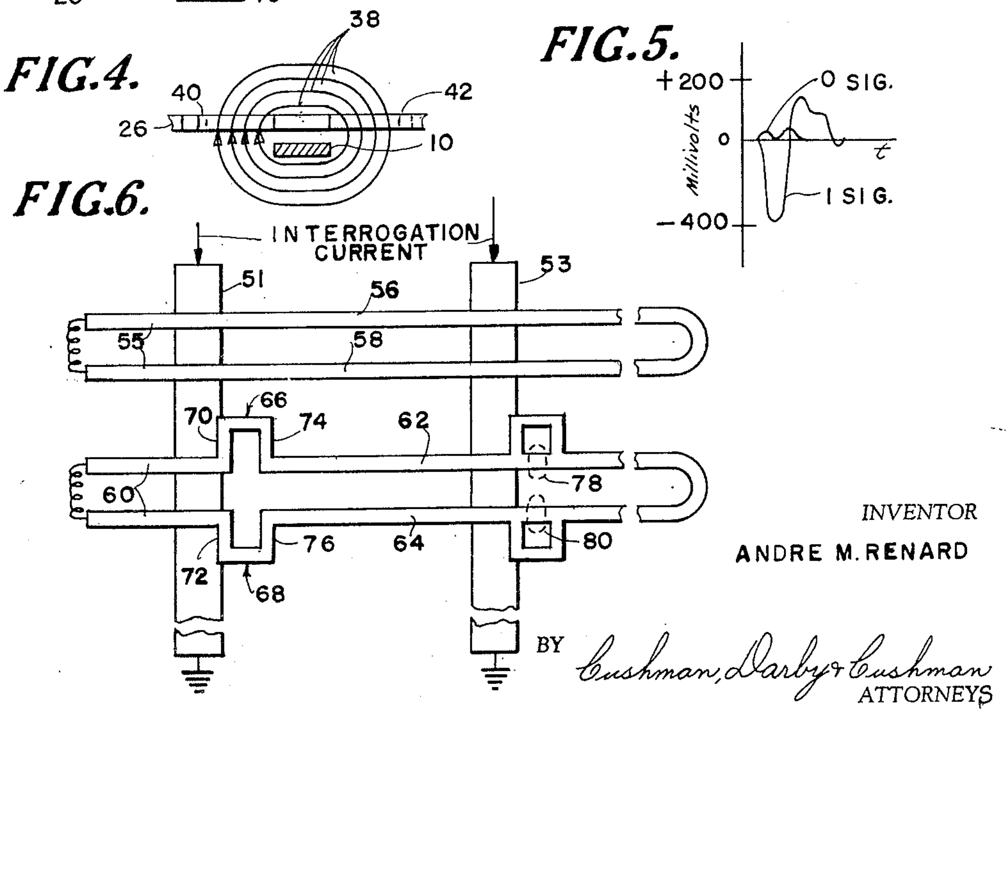

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

FIGURE 1 illustrates a counter flux type embodiment of the invention;

FIGURES 2, 3 and 4 indicate different views of the FIGURE 1 structure;

FIGURE 5 illustrates output signal waveforms which may be effected by the apparatus of FIGURE 1, and FIGURE 6 is another embodiment of the invention.

In the non-destructive memory embodiment illustrated in FIGURES 1 through 4, only two drive lines 10 and 12 are shown, but more or less than this number may be employed within the confines of this invention. In addition, only two output lines 14 and 16 are illustrated, but likewise that number may be increased or decreased as desired. Each of the output lines includes two conductors. For example, output line 14 is made up of conductor 18 and conductor 20 connected at one end 22 to form a loop. The other end of output line 14 may be coupled to a winding 24 such as the input winding of a magnetic core or transformer. In like manner, output line 16 includes conductors 26 and 28 interconnected at one end 30 to form a similar loop, with winding 32 being connected to the other end of the output line 16. For purposes later to be described, a band 34 in the form of a ring or washer is placed over the output line 14 to one side of drive line 10. Band 36 has a similar location relative to drive line 12 and output line 14. Each of these bands or rings 34, 36 is of metallic material, preferably non-magnetic, such as copper.

FIGURES 2 and 3 illustrate the stacked relation of the drive and output lines and the rings. From these figures, it will be appreciated that the drive lines and output lines at each crossing thereof are insulated from each other. This may be done by actual insulation between these lines, or by air coupling. Preferably, the drive and output or sense lines are printed circuitry, in which case the usual printed circuit backing may be employed as the insulation between the drive and output lines.

When an interrogation current is applied to drive line 10, there is produced a flux which encircles the drive line along its length. This flux is represented in FIGURE 4 in the usual manner as by lines 38. The final amplitude of the current applied determines the effective boundary of the flux on each side of the drive line. For purposes of this discussion, it is assumed that the current in the drive line has a maximum amplitude such that the flux boundary to the left and right of the drive line, i.e., in the directions in which the output line 16 extends, is effectively at approximately points 40 and 42. It will be appreciated that these points are equidistant from the left and right edges of the drive line. The spacing between conductors 26 and 28 in area $A_1$ of FIGURE 1 as bounded thereby and the left edge of drive line 10 and dash line 40' (which corresponds to point 40 of FIGURE 4) is the same as the spacing between those conductors in area $A_2$ as bounded thereby and the right edge of conductor 10 along with dash line 42' (which corresponds to point 42). In addition, the flux densities in areas $A_1$ and $A_2$ are equal since there is nothing present in either of these areas to unbalance the flux densities. Consequently, the amount of the drive line encircling flux cutting output line 16 at area $A_1$ is equal to the amount of that flux cutting area $A_2$. Since the flux cuts area $A_1$ in a direction opposite to that in which it cuts area $A_2$, the flux condition of output line 16 in response to a current on drive line 10 is balanced, i.e., the fluxes cutting areas $A_1$ and $A_2$ are equal but of opposite polarity. Consequently under such conditions, no voltage is induced across output line 16 and winding 32.

However, if one or the other of areas $A_1$, $A_2$ has a band such as copper ring 34 placed over it, the flux condition of the output line becomes unbalanced. This is due to the drive line encircling flux linking the ring and inducing eddy currents therein. These eddy currents in turn generate a counter flux which opposes the flux generated by current in the drive line, substantially reducing the flux density and resulting net amount of flux cutting the area of the output line associated with the ring. As shown in FIGURE 2, the presence of ring 34 produces a counter flux as indicated by arrow 44 when drive line 10 is producing encircling flux in the direction indicated in FIGURE 4. With one such output line area receiving less net flux than the output line area on the opposite side of the drive line, the difference in flux therebetween causes a generation of a substantial net voltage across the output line.

In certain respects, the invention as above described is similar to that in the aforementioned copending application of Richard J. Petschauer. One of the main differences is that by my invention the copper ring by virtue of its aperture allows the drive line produced flux to pass through the ring and generate a stronger counter flux than can be generated by the Petschauer apparatus. In the Petschauer apparatus a counter flux is generated in both areas of the output line aside the drive line under all conditions when current is applied to the drive line. When changing from a balanced flux condition during which equal counter fluxes are coupled to the opposite sides of an output line, to an unbalanced condition, the Petschauer apparatus effects a reduction in the amount of counter flux generated for the output line area on one side of the drive line, thereby increasing the net amount of flux coupled to that area of the output line. By going from a no counter flux generation in either side area of the output line, to a generation of a strong counter flux on one side of the area, I effect by my invention a larger output signal than can be expected from the Petschauer apparatus.

In an arbitrary manner, the drive and output line intersections which have a copper ring associated with them may be considered as storing a binary 1, while any such intersection which has no ring associated with it may be considered a binary 0. In like manner, the output signal generated in an output line due to the presence of a copper ring may be considered a binary 1 signal, while that voltage generated in the output line when no ring is present at an interrogated intersection may be considered a binary 0 signal. The voltage wave-forms for these respective signals may be similar to those illustrated in FIGURE 5.

If copper ring 34 were placed on the opposite side of drive line 10, for example as in area $A_2$, the output signal would be of a polarity opposite to that indicated in FIGURE 5 for the binary 1 signal. Consequently, a memory may be constructed with a ring on one side of a drive line representing a binary 1 and a ring on the other side of the drive line representing a binary 0, with any one intersection having one or the other but not both or neither. This would have the advantage of providing a self-checking type memory in that upon each interrogation there should be an output pulse of one polarity or the other from each output line. The absence of a pulse would mean that the bit position interrogated, incorrectly contained no ring, or that an interrogation current did not occur due to a faulty drive amplifier for example, or that there was a failure in the operation of the output circuitry connected to the output line. Additionally, by employing a ring at each intersection of a drive line and output line, either the complement or non-complement, or both, type output signals may be obtained by strobing the output signal at appropriate times. This may be especially accomplished if the drive line current retains its maximum amplitude for a short period of time rather than instantaneously reversing its direction of rate of change. In addition, three stable states may be obtained by the employment of no ring, a left hand ring, or a right hand ring at each of the drive line and output line intersections.

For changeable storage operation, the rings are preferably embedded or otherwise attached to a non-metallic plate or card. For example, the card may be of plastic or of stiff cardboard. In fabrication, a ring may be placed at each digit position, with certain of the rings being later punched out to represent the desired binary conditions. Alternatively, the copper rings may be initially placed only in the digit positions where desired according to the binary condition to be represented at the respective digit positions. It will be appreciated that any binary word stored in the memory is stored along a given drive line and that thus the memory matrix operates in a word-organized mode. For storing different words, it is necessary to change to a different plate or card. In other words, the present invention provides a permanent type storage system which may be manually changeable as desired from time to time by replacement of the card or plate, "permanent" meaning, as previously indicated, that no electrical or magnetic signal can possibly change any digit stored.

In FIGURE 1, it will be noted that the spacing between the two conductors of any one output line is considerably diminished at several places by the curving or indenting of one of the conductors toward the other. As illustrated, this is done on each side of each drive line, for example by the squared U-shaped indentations 46 and 48, as well as 50 and 52. The purpose of diminishing the spacing between conductors 18 and 20 by indentation 50 is to aid in isolating the counter flux generated by ring 36 from area 54 adjacent the other drive line. It can therefore be appreciated that the spacing between the output line conductors need not be diminished as frequently as shown along the length of either of the output lines illustrated, but same is normally done in prefabrication of the output lines in order that a change in the program or sense of the binary digit stored at the different drive and output line intersections may be had without any redesigning of the output lines. With such isolating means, the spacing between drive lines may be considerably reduced.

FIGURE 6 illustrates another embodiment of this invention. In this embodiment, drive lines 51 and 53 are each insulatively cross coupled by output line 55 which consists of conductors 56 and 58 interconnected in loop form in a manner similar to that described for output line 16 of FIGURE 1. In FIGURE 6, the output line 54 is illustrated as crossing the drive lines at right angles. For the embodiment to be described, right angle crossing is preferred, and it should be noted that right angle crossing, rather than acute angle crossing of the output lines relative to the drive lines in FIGURE 1 may be effected, as desired, at the sacrifice of some loss of output signal magnitude. The effect of encircling flux generated by an interrogation current applied to drive line 51 in FIGURE 6, is similar to that above described relative to FIGURE 4 in that equal flux densities cut equal areas of the output line 54 on opposite sides of the drive line.

Output line 60, however, is differently constructed from the output lines of FIGURE 1, and the representation of the storage of a binary 1 is effected by a change in the area of the output line on one side of the drive line. For example, the output line conductors 62 and 64 may be prefabricated to include the opposing outward-going squared U-shape portions 66 and 68 respectively. By so doing, the area of the output line 60 on the right side of drive line 51 is considerably larger than the area on the left side thereof. Since the flux density remains the same, the amount of flux linking the output line 60 on the right side of drive line 51 is greater than that linking the area on the left side thereof. Consequently, the resulting unbalanced flux condition generates a substantial voltage across output line 60 when an interrogation current is applied to drive line 51. Another way of looking at the situation is to consider that a larger voltage is induced in the legs 70 and 72 than in legs 74 and 76, giving rise to a difference of potential across line 60.

Instead of output line 60 being prefabricated as indicated adjacent drive line 51, it may be prefabricated as indicated adjacent drive line 53, with the conductors within dash line circles 78 and 80 being opened, as by punching, when the binary digit at the drive and output line intersection is to represent a binary 1 rather than a binary 0. Without these areas being open, the output line thereabouts represents a binary 0 in the same manner as does the output line 55 at the intersection of either drive lines 51 or 53.

Thus it is apparent that this invention successfully achieves the various objects and advantages herein set forth.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A memory device with non-destructive sensing provisions comprising a drive line for carrying an interogating current to produce a flux encircling the drive line, an output line electrically insulated from said drive line but air cross coupled thereto so as to be linked by said flux itself, and non-magnetic means representing a binary digit for generating in response to said encircling flux a counter flux only when the digit represented is of one binary sense and not the other, said non-magnetic means being positioned on the side of said output line opposite the drive line and said counter flux being effective to substantially reduce the net flux coupled to the output line only on said one side of the drive line.

2. A memory device with non-destructive sensing provisions comprising a drive line for carrying an interrogation current to produce a flux encircling the drive line, a plurality of output lines insulatively cross coupled effectively, by air to said flux itself at spaced positions along said drive line, non-magnetic means, at at least one of said digit positions representing a binary digit of one sense and positioned on the side of the respective output line opposite to said drve line for generating in response to said encircling flux a flux countering the encircling flux linking that output line on one side of the drive line so as to reduce the net flux coupled to said one side, the other side of that output line being substantially free of any countering flux so to be linked by substantially the full amount of said encircling flux, a binary digit of another sense being represented at at least another of said digit positions by the absence of any counter flux generating non-magnetic means or the like for allowing the drive line encircling flux to be coupled in full and substantially equally to each side of the respective output line as effectively divided by the drive line.

3. A memory device with non-destructive sensing provisions comprising a drive line for carrying an interogration current to produce a flux encircling the drive line, an output line insulatively cross coupled effectively by air to said drive line, and a non-magnetic metallic band forming a loop and positioned on the side of the output line opposite the drive line and further to one side of the drive line substantially wholly within the influence of said encircling flux for generating a counter flux to reduce substantially the net amount of flux linking the output line only on said one side.

4. A memory device with non-destructive sensing provisions comprising a non-magnetic, non-metallic card or plate divided into a plurality of areas at least one of which has a non-magnetic metallic ring for representing the storage of a binary digit of one sense, at least another of said areas representing a binary digit of opposite sense by the absence of such ring, a plurality of output lines including first and second ones respectively positioned adjacent the said one and another areas, and at least one drive line insulatively crossing and being magnetically coupled to said output lines in the region of the said one and another areas on the side of said output lines opposite said areas and ring, the drive line being positioned at least mainly adjacent one edge of said ring with the said first output line being substantially centered on said ring as it crosses same.

5. A device as in claim 4 and further including a second drive line spaced from the first mentioned drive line and crossing each of said output lines with the same relation thereto and to a different group of said areas as aforementioned for the said first drive line and its respective areas, the said first output line being also coupled to another area in said group and having a second ring like the first mentioned ring coupled to the second drive line, said first output line being comprised of two parallel spaced conductors in a loop configuration with the spacing of said conductors at at least one point between said drive lines and at distance away from one of the drive lines substantially equal to the diameter of one of said rings being considerably reduced relative to the spacing between the conductors at other points.

6. A device as in claim 1 wherein the said counter flux generating means is off-center positioned relative to the crossing point of said drive and output lines.

7. A device as in claim 6 wherein said counter flux generating means is substantially physically centered on said output line.

8. A device as in claim 1 and further including means for limiting the maximum encirclement of said encircling flux in at least most of its coupling of said output line in at least one direction from the respective edge of said drive line to a given distance.

9. A device as in claim 1 wherein said output line crosses said drive line at an oblique angle.

10. A device as in claim 1 wherein said output line is effectively formed of two conductors interconnected at an end remote from said drive line, said conductors being spaced a substantially uniform distance apart at least for a predetermined distance in both directions from respective edges of said drive line.

11. A device as in claim 10 including, in at least one of said directions and at approximately a given distance from the respective edge of said drive line, means for substantially confining said encircling flux as it exists between said conductors in said one direction to within said given distance.

12. A device as in claim 10 wherein said conductors cross said drive line at substantially the same angle which is an acute angle relative to the longitudinal axis of said drive line in the area of crossing.

13. A device as in claim 12 wherein at least one of said conductors at least momentarily approaches but does not electrically touch the other in its length following said predetermined distance in at least one of said directions.

14. An output line for use in a memory array having a plurality of discrete digit storage positions, comprising effectively two conductors interconnected at one end, said conductors being spaced and extending generally parallel for a substantial length from said end, there being along the length of said conductors at least one point which is predetermined in position to be adjacent a corresponding one of said storage positions when said output line is used in said array, the spacing between said conductors being considerably different at said one point than at other adjacent points.

15. An output line as in claim 14 wherein at least one of said conductors untouchingly extends toward the other at said one point.

16. An output line as in claim 14 wherein at least one of said conductors extends outwardly from the other at said one point.

References Cited in the file of this patent

UNITED STATES PATENTS

| | | |
|---|---|---|
| 2,922,146 | Smith | Jan. 19, 1960 |
| 3,011,156 | MacPherson | Nov. 28, 1961 |
| 3,061,821 | Gribble | Oct. 30, 1962 |